(12) United States Patent
Burtoft

(10) Patent No.: US 12,169,538 B2
(45) Date of Patent: Dec. 17, 2024

(54) DETERMINING THE TECHNICAL MATURITY OF A SYSTEM USER TO USE AS A RISK INDICATOR WHEN AUDITING SYSTEM ACTIVITY

(71) Applicant: Imperva, Inc., San Mateo, CA (US)

(72) Inventor: James Arthur Burtoft, Bellefonte, PA (US)

(73) Assignee: Imperva, Inc., San Mateo, CA (US)

( * ) Notice: Subject to any disclaimer, the term of this patent is extended or adjusted under 35 U.S.C. 154(b) by 349 days.

(21) Appl. No.: 17/455,588

(22) Filed: Nov. 18, 2021

(65) Prior Publication Data

US 2023/0153404 A1    May 18, 2023

(51) Int. Cl.
  *G06F 21/31* (2013.01)
  *G06F 21/55* (2013.01)

(52) U.S. Cl.
  CPC .......... *G06F 21/316* (2013.01); *G06F 21/552* (2013.01); *G06F 2221/2101* (2013.01)

(58) Field of Classification Search
  CPC .... G06F 21/316; G06F 21/552; G06F 21/554; G06F 21/6227; G06F 2221/2101
  See application file for complete search history.

(56) References Cited

U.S. PATENT DOCUMENTS

| | | | | |
|---|---|---|---|---|
| 6,256,737 B1 * | 7/2001 | Bianco | ................. | G07C 9/37 713/186 |
| 7,774,361 B1 * | 8/2010 | Nachenberg | ........ | H04L 63/1416 707/952 |
| 9,256,798 B2 | 2/2016 | Walker et al. | | |
| 9,722,996 B1 * | 8/2017 | Kolman | ................. | H04L 63/083 |
| 11,055,407 B2 * | 7/2021 | Herwadkar | ........... | G06F 21/566 |
| 2010/0115610 A1 * | 5/2010 | Tredoux | ................ | G06F 21/316 726/19 |
| 2010/0175116 A1 * | 7/2010 | Gum | ..................... | H04L 63/107 726/6 |
| 2011/0321175 A1 * | 12/2011 | Slater | .................... | G06F 21/552 726/28 |
| 2013/0042327 A1 * | 2/2013 | Chow | ................... | G06F 21/316 726/28 |
| 2013/0305357 A1 * | 11/2013 | Ayyagari | .............. | H04L 41/069 726/22 |

(Continued)

OTHER PUBLICATIONS

E. Bertino, A. Kamra and J. P. Early, "Profiling Database Application to Detect SQL Injection Attacks," 2007 IEEE International Performance, Computing, and Communications Conference, New Orleans, LA, USA, 2007, pp. 449-458, doi: 10.1109/PCCC.2007.358926. (Year: 2007).*

(Continued)

*Primary Examiner* — Michael Simitoski

(57) ABSTRACT

A method by one or more computing devices to detect anomalous accesses to a system. The method includes generating a technical maturity profile of a system user based on analyzing historical commands submitted by the system user to the system and determining whether an access by the system user to the system is anomalous based on determining technical maturity attributes of a command submitted by the system user to perform the access and comparing the technical maturity attributes of the command to the technical maturity profile of the system user.

20 Claims, 4 Drawing Sheets

(56) References Cited

U.S. PATENT DOCUMENTS

| | | | | |
|---|---|---|---|---|
| 2016/0006730 | A1* | 1/2016 | Chari | G06F 21/32 |
| | | | | 726/7 |
| 2018/0157978 | A1* | 6/2018 | Buda | G06N 20/00 |
| 2018/0332071 | A1* | 11/2018 | Ford | H04L 9/3236 |
| 2018/0349583 | A1* | 12/2018 | Turgeman | H04L 63/0861 |
| 2019/0068604 | A1* | 2/2019 | Legault | H04L 63/08 |
| 2019/0356688 | A1* | 11/2019 | Ford | H04L 63/102 |
| 2020/0280552 | A1* | 9/2020 | Alexander | H04L 63/083 |
| 2020/0410091 | A1* | 12/2020 | Kimon | G06N 3/084 |
| 2021/0110014 | A1* | 4/2021 | Turgeman | G06F 11/3419 |
| 2021/0168147 | A1* | 6/2021 | Gupta | H04L 63/1425 |
| 2021/0328969 | A1* | 10/2021 | Gaddam | G06F 21/44 |
| 2023/0011236 | A1* | 1/2023 | Ur | H04L 63/1416 |

OTHER PUBLICATIONS

L. Bossi, E. Bertino and S. R. Hussain, "A System for Profiling and Monitoring Database Access Patterns by Application Programs for Anomaly Detection," in IEEE Transactions on Software Engineering, vol. 43, No. 5, pp. 415-431, May 1, 2017, doi: 10.1109/TSE.2016.2598336. (Year: 2017).*

Lee, Sin Yeung, Wai Lup Low, and Pei Yuen Wong. "Learning fingerprints for a database intrusion detection system." Computer Security—Esorics 2002: 7th European Symposium on Research in Computer Security Zurich, Switzerland, Oct. 14-16, 2002 Proceedings 7. Springer Berlin Heidelberg, 2002. (Year: 2002).*

U. P. Rao, G. J. Sahani and D. R. Patel, "Machine learning proposed approach for detecting database intrusions in RBAC enabled databases," 2010 Second International conference on Computing, Communication and Networking Technologies, Karur, India, 2010, pp. 1-4, doi: 10.1109/ICCCNT.2010.5591574. (Year: 2010).*

J.-h. Roh, S.-H. Lee and S. Kim, "Anomaly detection of access patterns in database," 2015 International Conference on Information and Communication Technology Convergence (ICTC), Jeju, Korea (South), 2015, pp. 1112-1115, doi: 10.1109/ICTC.2015.7354751. (Year: 2015).*

Valeur, Fredrik, Darren Mutz, and Giovanni Vigna. "A learning-based approach to the detection of SQL attacks." Detection of Intrusions and Malware, and Vulnerability Assessment: Second International Conference, DIMVA 2005, Vienna, Austria, Jul. 7-8, 2005. Proceedings 2. Springer, 2005. (Year: 2005).*

Kamra A, Terzi E, Bertino E. Detecting anomalous access patterns in relational databases. The VLDB Journal. Aug. 2008;17(5):1063-77. (Year: 2008).*

A. Sallam, E. Bertino, S. R. Hussain, D. Landers, R. M. Lefler and D. Steiner, "DBSAFEâAn Anomaly Detection System to Protect Databases From Exfiltration Attempts," in IEEE Systems Journal, vol. 11, No. 2, pp. 483-493, Jun. 2017, doi: 10.1109/JSYST.2015.2487221. (Year: 2017).*

Sallam A, Bertino E. Techniques and systems for anomaly detection in database systems. Policy-Based Autonomic Data Governance. 2019:113-33. (Year: 2019).*

A. Zargar, A. Nowroozi and R. Jalili, "Xaba: A zero-knowledge anomaly-based behavioral analysis method to detect insider threats," 2016 13th International Iranian Society of Cryptology Conference on Information Security and Cryptology (ISCISC), Tehran, Iran, 2016. (Year: 2016).*

Imperva, "v4.1 Data Risk Analytics User Guide," Copyright 2002-2021, pp. 1-297.

Khaicy, "Why hackers should be afraid of how they write," The Sydney Morning Herald, Jan. 16, 2013, 3 pages.

* cited by examiner

Figure 2

| | Predefined Attribute Type | Technical Maturity |
|---|---|---|
| 200A | Number of clauses used in database command | Higher number indicates more advanced technical maturity |
| 200B | Number of sub-commands submitted as a batch | Higher number indicates more advanced technical maturity |
| 200C | Use of variables in database command | Indicates more advanced technical maturity |
| 200D | Use of syntactically unnecessary parentheses in database command | Indicates less advanced technical maturity |
| 200E | Use of aliasing in database command | Indicates more advanced technical maturity |
| 200F | Use of a more verbose construct in database command when there is a less verbose construct that is functionally equivalent | Indicates less advanced technical maturity |
| 200G | Use of outer joins in database command | Indicates more advanced technical maturity |
| 200H | Use of a keyword in database command that is unique to a particular database platform | Indicates more advanced technical maturity |
| 200I | Number of errors generated as a result of submitting database command | Higher number of errors indicates less advanced technical maturity |
| 200J | Syntax errors in database command | Indicates less advanced technical maturity |
| 200K | Database command relates to system table | Indicates more advanced technical maturity |
| 200L | Database command relates to schema change | Indicates more advanced technical maturity |
| 200M | Database command relates to creation of index table or lookup table | Indicates more advanced technical maturity |

DETERMINING THE TECHNICAL MATURITY OF A SYSTEM USER TO USE AS A RISK INDICATOR WHEN AUDITING SYSTEM ACTIVITY

TECHNICAL FIELD

Embodiments of the invention relate to the field of detecting anomalous accesses to a system, and more specifically, to detecting anomalous accesses to a system based on changes in technical maturity of system users.

BACKGROUND

An enterprise may use one or more databases to store data pertaining to the enterprise, which may include sensitive data such as transactional data (e.g., credit card numbers and bank account numbers), personal data (e.g., social security numbers, phone numbers, and medical history), business-related data (e.g., trade secrets and financial data), and/or governmental data (e.g., classified/secret information). Thus, it is of utmost importance for the enterprise to protect the data stored in its databases from malicious or otherwise unwanted accesses. Failure to protect the data may cause financial loss, loss of reputation and customer trust, and/or legal liability for the enterprise.

An enterprise may use a database activity audit tool to audit the activity of its databases. The database activity audit tool may generate database audit information (e.g., in a database audit log) that includes information regarding the database accesses made to the databases such as which database objects and/or database records were touched by the database accesses, which database users performed which database accesses, and at what time/day the database accesses were performed.

Enterprises may also use an anomalous database access detection tool to detect anomalous data accesses made to its databases. The anomalous database access detection tool may apply machine learning techniques to historical database audit information (e.g., that was previously generated by a database activity audit tool) to learn the normal/baseline database access patterns for the databases and flag any subsequent database accesses that deviate from the normal/baseline database access patterns as being anomalous or suspicious. The anomalous database access detection tool may generate an alert (e.g., to notify a data security team of the enterprise) if an anomalous database access is detected.

BRIEF DESCRIPTION OF THE DRAWINGS

The invention may best be understood by referring to the following description and accompanying drawings that are used to illustrate embodiments of the invention. In the drawings:

FIG. 2 shows a table of predefined attribute types and how they indicate technical maturity, according to some embodiments.

DETAILED DESCRIPTION

Figure 1:
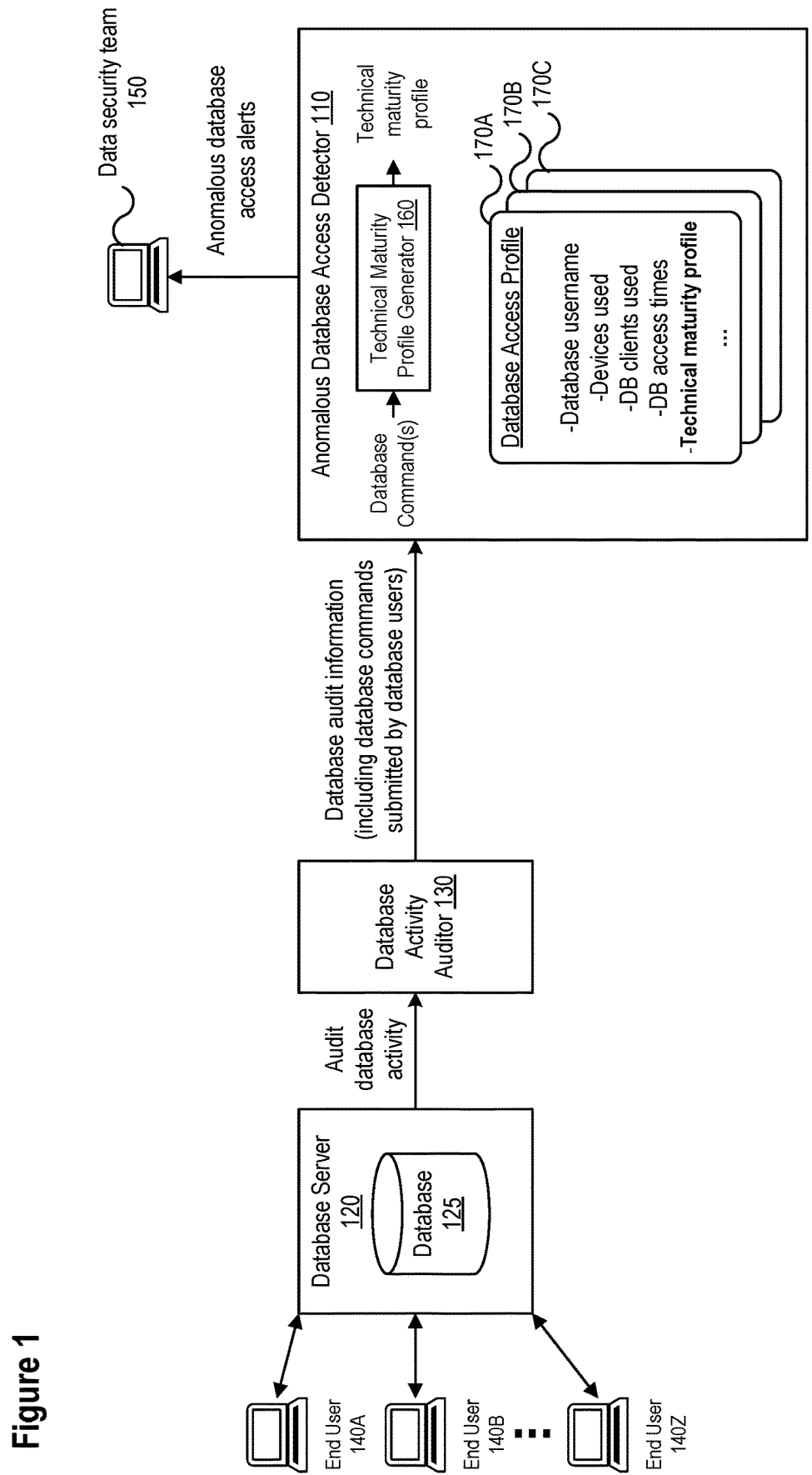
FIG. 1 shows an environment in which anomalous database accesses to a database may be detected based on changes in technical maturity of database users, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

As mentioned above, an enterprise may use an anomalous database access detection tool to detect anomalous data accesses made to its databases. The anomalous database access detection tool may apply machine learning techniques to historical database audit information (e.g., that was previously generated by a database activity audit tool) to learn the normal/baseline database access patterns for the databases and flag any subsequent database accesses that deviate from the normal/baseline database access patterns as being anomalous or suspicious. The anomalous database access detection tool may generate an alert (e.g., to notify a data security team of the enterprise) if an anomalous database access is detected.

An anomalous database access detection tool may consider a variety of risk factors when determining whether a database access is anomalous or not. These risk factors include, for example, changes in the database objects and/or records touched by database accesses, changes in the time of day that database accesses are performed (e.g., database accesses performed outside of normal work hours), the use of uncommon database commands that are sometimes associated with hacking, and/or changes in the devices or applications used to perform database accesses. These risk factors assume that the end users of the databases have particular roles and that their roles do not change over time. However, if an end user changes roles (e.g., the end user changes roles from being a database administrator to being a data scientist or the end user changes roles from being a database administrator for the marketing department to being a database administrator for the sales department), the way they access databases may change. However, the technical maturity of end users generally remains consistent over time in whatever they do. As such, changes in technical maturity may indicate a risk/threat in ways that existing risk factors cannot (e.g., it may indicate an impersonation or sharing of database user accounts).

A person's language ability may be evaluated based on the vocabulary they use, the lengths of sentences they use, the complexity of the sentences they use, and the construction of the sentences they use. In a similar manner, embodiments may determine the technical maturity of a database user (and by extension the technical maturity of the end user (e.g., human user) behind the database user) based on analyzing various attributes of database commands submitted by the database user that have been designated as being indicative of technical maturity.

While the technical maturity of a database user may change over time (just as a person's language ability might change over time), it is not expected to change significantly in a short period of time. Thus, a significant change in the technical maturity of a database user may indicate that a database user account associated with the database user has been compromised (e.g., someone is trying to impersonate the database user account owner), the database user account is being shared by multiple end users, and/or the end user copied someone else's code/commands. Embodiments may use the change in technical maturity of a database user as a risk factor (e.g., among multiple risk factors) when detecting anomalous database accesses, thereby allowing for more accurate detection of anomalous database accesses.

For purposes of illustration, embodiments are primarily described herein in the context of detecting anomalous database accesses to a database. However, it should be understood that the techniques and principles described herein can be adapted to apply in other contexts. More generally, the techniques and principles described herein may be used to detect anomalous accesses to any type of computing system in which system users submit commands to the system to access the system. As used herein, accessing a system may refer to the act of causing the system to perform a desired operation such as configuring/administering the system and/or querying the system for information.

One example embodiment is a method by one or more computing devices to detect anomalous accesses to a system. The method includes generating a technical maturity profile of a system user based on analyzing historical commands submitted by the system user to the system and determining whether an access by the system user to the system is anomalous based on determining technical maturity attributes of a command submitted by the system user to perform the access and comparing the technical maturity attributes of the command to the technical maturity profile of the system user. Embodiments will now be described with reference to the accompanying figures.

FIG. 1 shows an environment in which anomalous database accesses to a database may be detected based on changes in technical maturity of database users, according to some embodiments. As shown in the figure, the environment includes end users 140A-Z, a database server 120, a database activity auditor 130, an anomalous database access detector 110, and a data security team 150.

The database server 120 implements a database 125 (e.g., which may store data of an enterprise). The database server 120 may be implemented using one or more computing devices. For sake of illustration, the figure shows the database server 120 implementing a single database 125. It should be understood, however, that the database server 120 may implement more than one database 125. In one embodiment, the database 125 is a relational database that can be queried and/or configured using structured query language (SQL).

The end users 140A-Z may each operate a user device executing a database client to communicate with the database server 120 and access the database 125. Examples of user devices include, but are not limited to, desktops, laptops, mobile phones, tablets, and smart watches. The end users 140A-Z may have to log in to a database user account to access the database 125. Each database user account may be associated with a database username and password (or other type of credential). Thus, the end users 140A-Z may have to provide a database username and password (or other type of credential) before being able to access the database 125. Once logged in to a database user account, the end users 140A-Z may access the database 125 by submitting database commands to the database 125 (e.g., in SQL format or similar format). The database commands may include, for example, commands to read one or more records (e.g., rows) from a database object (e.g., a database table) of the database 125, modify one or more records of a database object of the database 125, add records to a database object of the database 125, add a database object to the database 125, and/or delete one or more records from a database object of the database 125. As used herein, a database user corresponds to a database user account. It should be noted that multiple end users 140 (e.g., human users) may use the same database user account to access the database 125 (e.g., due to the credentials of the database user account being compromised or the database user account being shared by multiple end users). An end user 140 that is using a database user account associated with a database user to access the database 125 may be referred to herein as the end user 140 that is "behind" the database user.

The database activity auditor 130 may audit the database activity of the database 125 and store a result of the audit (e.g., in a database audit log), which may be referred to herein as database audit information. The database audit information may include information regarding the database accesses made to the databases (including failed attempts in some embodiments) such as which database objects and/or database records were touched by the database accesses, which database users performed which database accesses, and at what time/day the database accesses were performed. The database audit information may also include the actual database commands submitted by database users to perform the database accesses (e.g., the full SQL text entered by the end user 140 behind the database user to perform a database access). The database activity auditor 130 may provide the database audit information (including the database commands submitted by the database users) to the anomalous database access detector 110 for further analysis. In one embodiment, the database activity auditor 130 sends database audit information to the anomalous database access detector 110 as the information is collected/generated (a "push" mechanism). In another embodiment, the database activity auditor 130 sends database audit information to the anomalous database access detector 110 upon receiving a request from the anomalous database access detector 110 for the database audit information (a "pull" mechanism). The database activity auditor 130 may be implemented using one or more computing devices.

The anomalous database access detector 110 may generate a database access profile 170 for each of one or more database users of the database 125 based on analyzing historical database audit information provided by the database activity auditor 130. For example, as shown in the figure, the anomalous database access detector 110 may generate database access profiles 170A-C, where each database access profile 170 pertains to a different database user. The database access profile 170 of a database user may include various information regarding the manner in which that database user typically accesses the database 125. For example, as shown in the figure, the database access profile 170 of a database user may include the database username of the database user (or other type of identifier that uniquely identifies the database user), information regarding the devices typically used by the database user to access the database 125, information regarding the database clients/applications typically used by the database user to access the database 125, and/or the time of day that the database user typically accesses the database 125. The database access profiles 170 may be generated based on applying machine learning techniques to the database audit information. For sake of illustration, the figure only shows three database access profiles 170A-C. It should be understood, however, that there may be more or less database access profiles 170 depending on the number of database user that are being profiled.

As shown in the figure, the anomalous database access detector 110 includes a technical maturity profile generator 160. The technical maturity profile generator 160 may take historical database commands submitted by a database user as input and generate a technical maturity profile for the database user based on analyzing those historical database commands. As part of generating the technical maturity profile of a database user, the technical maturity profile generator 160 may determine various technical maturity attributes of the historical database commands submitted by the database user. The technical maturity attributes may correspond to predefined attribute types that have been designated (e.g., by the vendor providing the anomalous database access detector 110 and/or by the data security team 150 of an enterprise using the anomalous database access detector 110) as being indicative of technical maturity. The predefined attribute types may include one or more of: the number of clauses used in a database command, the number of sub-commands submitted as a batch, whether variables are used in a database command (e.g., instead of copying and pasting output to input), whether syntactically unnecessary parentheses are used in a database command, whether aliasing is used in a database command (or whether other types of more "advanced" SQL features such as "GROUP BY," "WITH," "DECLARE," and "SELECT INTO" are used), whether a more verbose construct is used in a database command when there is a less verbose construct that is functionally equivalent, whether an outer join is used in a database command, whether abbreviations are used in database commands (e.g., use of "SEL" instead of "SELECT" in database platforms that support the abbreviation), whether a keyword that that is unique to a particular database platform (e.g., outside of standard SQL) is used in a database command, the number of errors generated as a result of submitting database commands, whether syntax errors or misspellings occur in a database command, whether a database command relates to a system table, whether a database command relates to a schema change, and whether a database command relates to the creation of an index table or lookup table. It should be understood that these predefined attribute types are provided by way of example and not meant to be an exhaustive list. Some embodiments may make use of attribute types that are not listed above. In general, properties of database commands that do not affect the function/result but relate to a form in which the database commands are written may be good candidates for the predefined attribute types.

To illustrate an example, the below database commands produce the same result but the first one may suggest more advanced technical maturity, as it is less verbose due to the use of a more complex function (i.e., the use of the ">=" operator).

(1) SELECT DepartmentID, Name
    FROM HumanResources.Department
    WHERE DepartmentID>=13;
(2) SELECT DepartmentID, Name
    FROM HumanResources.Department
    WHERE DepartmentID>13 OR DepartmentID=13;

As another example, the below database commands produce the same result and both may suggest more advanced technical maturity, as they show the use of aliasing. The "AS" keyword is used to rename a column or database table with an alias in the result (e.g., rename the column "StudentID" to "ID" in the example below) on some database platforms. The second database command may suggest that the database user has more experience because they realize the "AS" keyword is optional.

(1) SELECT StudentID AS ID, Student_Address
    FROM Student;
(2) SELECT StudentID ID, Student_Address
    FROM Student;

As another example, the below database commands produce the same result but the first one may suggest more advanced technical maturity, as it uses the "SELECT INTO" keyword (for copying data from one database table to another database table). Also, the use of a temporary table (using the "#" notation) in both database commands may suggest more advanced technical maturity.

(1) SELECT * INTO #TempLocation FROM Production.Location
(2) INSERT INTO #TempLocation SELECT * FROM Production.Location In one embodiment, the technical maturity profile of a database user includes information regarding the technical maturity attributes of the historical database commands submitted by that database user. For example, the technical maturity profile of a database user may include the average number of clauses used in historical database commands submitted by the database user (or other statistical measure such as the median or mode), the average number of sub-commands submitted in historical database commands submitted by the database user (or other statistical measure such as the median or mode), a value (e.g., a boolean value) indicating whether variables are used in historical database commands submitted by the database user, and so on. In one embodiment, information regarding a certain technical maturity attribute may be included in the technical maturity profile in the form of a list or array of values/objects. For example, information regarding a technical maturity attribute that corresponds to the use of abbreviations in database commands may be included in the technical maturity profile in the form of a list or array of abbreviations used in the historical database commands submitted by the database user (e.g., "SEL" (as an abbreviation for "SELECT"), "DEL" (as an abbreviation for "DELETE"), etc.). In one embodiment, the technical maturity profile of a database user includes a value representing the technical maturity of the database user that is determined based on the technical maturity attributes of the historical database commands submitted by that database user. For example, the value may be an integer between 1-10, where a higher number indicates more advanced technical maturity and a lower number indicates less advanced technical maturity.

The anomalous database access detector 110 may use the technical maturity profile generator 160 to generate a technical maturity profile of a database user and include the technical maturity profile in the database access profile 170 of that database user. As a result, as shown in the figure, a database access profile 170 of a database user may include the technical maturity profile of the database user (e.g., among other information).

The anomalous database access detector 110 may use the technical maturity profiles included in the database access profiles 170 (e.g., in addition to other information included in the database access profiles 170) to detect anomalous database accesses to the database 125 by the database users. In one embodiment, the anomalous database access detector 110 determines whether one or more database accesses by a database user are anomalous based on determining the technical maturity attributes of one or more database commands submitted by the database user to perform the database accesses and comparing the technical maturity attributes of the one or more database commands to the technical maturity profile of the database user.

The technical maturity attributes of the one or more database commands may correspond to the predefined attribute types that have been designated as being indicative of technical maturity (e.g., the same ones used to generate the technical maturity profile of the database user). In one embodiment, if the technical maturity profile of the database user includes information regarding the technical maturity attributes of the historical database commands submitted by that database user, then the comparison between the technical maturity attributes of the one or more database commands and the technical maturity profile of the database user may involve comparing the attributes of the one or more database commands to the information included in the technical maturity profile of the database user regarding the technical maturity attributes of the historical database commands submitted by the database user (e.g., comparing the technical maturity attributes of the one or more database commands to the corresponding information in the technical maturity profile). For example, the anomalous database access detector 110 may determine the number of clauses used in a database command submitted by the database user and then compare it to the average number of clauses used in historical database commands submitted by the database user as indicated in the technical maturity profile of the database user. As another example, the anomalous database access detector 120 may determine the abbreviations used in a database command submitted by the database user and then compare it against the list of abbreviations used in historical database commands submitted by the database user as indicated in the technical maturity profile of the database user (to see if the database user has previously used such an abbreviation). In one embodiment, if the technical maturity profile of the database user includes a value representing the technical maturity of the database user (which will be referred to as the "first" value), then the comparison between the technical maturity attributes of the one or more database commands and the technical maturity profile of the database user may involve determining a value (which will be referred to as the "second" value) that represents the technical maturity required to form the one or more database commands based on the technical maturity attributes of the one or more database commands and comparing the first value to the second value.

If the comparison indicates that there is a significant disparity between the technical maturity attributes of the one or more database commands submitted by the database user to perform the one or more database accesses and the technical maturity profile of the database user (e.g., which may be based on comparing corresponding technical maturity attributes or based on comparing the first value to the second value), then the anomalous database access detector 110 may flag the database accesses as being anomalous or suspicious and generate an alert (e.g., to notify the data security team 150). What is considered as being a significant disparity may be configurable depending on the amount of tolerance that is allowed. Changes in technical maturity may be used as one risk factor along with one or more other risk factors (e.g., changes in the devices used, changes in the database clients used, and/or changes in access times compared to what is indicated in the database access profile 170 of the database user).

In one embodiment, the anomalous database access detector 110 periodically updates the technical maturity profile of a database user (e.g., based on analyzing additional (more recent) historical database commands submitted by the database user). This way, the technical maturity profile of the database user may be updated over time to reflect the database user's evolving technical maturity.

Using a change in technical maturity as a risk factor may be particularly advantageous for detecting impersonation and/or shared database user account usage. A change in technical maturity may also indicate copying of code/commands. While copying of code/commands is not necessarily a security risk in and of itself, it may be a risk factor for other behavior. False positives in this regard may be reduced by correlating changes in technical maturity with errors and multiple runs (e.g., if an end user is copying code, then it is expected that there will be multiple errors and multiple runs).

While embodiments have been primarily described in the context of detecting anomalous database accesses to a database, the techniques described herein may be adapted to apply in other contexts and/or for other purposes. For example, the techniques described herein may be used to detect anomalous admin accesses to a web server. As another example, the techniques described herein may be used to evaluate the technical maturity of potential job applicants or existing employees of an enterprise.

FIG. 2 shows a table of predefined attribute types and how they indicate technical maturity, according to some embodiments. As shown in the figure the table includes a "Predefined Attribute Type" column and a "Technical Maturity" column. The "Predefined Attribute Type" column indicates the attribute type and the "Technical Maturity" column indicates how the attribute type may indicate technical maturity.

As shown in row 200A of the table, one example of a predefined attribute type is the number of clauses used in a database command. In general, a higher number for this attribute type indicates more advanced technical maturity (and a lower number indicates less advanced technical maturity).

As shown in row 200B of the table, another example of a predefined attribute type is the number of sub-commands submitted as a batch. In general, a higher number for this attribute type indicates more advanced technical maturity.

As shown in row 200C of the table, another example of predefined attribute type is the use of variables in a database command. In general, the use of variables indicates more advanced technical maturity.

As shown in row 200D of the table, another example of predefined attribute type is the use of syntactically unnecessary parenthesis in a database command. In general, the use of syntactically unnecessary parenthesis indicates less advanced technical maturity.

As shown in row 200E of the table, another example of predefined attribute type is the use of aliasing in a database command. In general, the use of aliasing indicates more advanced technical maturity.

As shown in row 200F of the table, another example of predefined attribute type is the use of a more verbose construct in a database command when there is a less verbose construct that is functionally equivalent. In general, the use of a more verbose construct when there is a less verbose construct that is functionally equivalent indicates less advanced technical maturity.

As shown in row 200G of the table, another example of predefined attribute type is the use of outer joins in a database command. In general, the use of outer joins indicates more advanced technical maturity.

As shown in row 200H of the table, another example of predefined attribute type is the use of a keyword in a database command that is unique to a particular database platform. In general, the use of a keyword in a database command that is unique to a particular database platform indicates more advanced technical maturity.

As shown in row 200I of the table, another example of predefined attribute type is the number of errors generated as a result of submitting database commands. In general, a higher number for this attribute type indicates less advanced technical maturity.

As shown in row 200J of the table, another example of predefined attribute type is the presence of syntax errors in a database command. In general, the presence of syntax errors indicates less advanced technical maturity.

As shown in row 200K of the table, another example of predefined attribute type is whether a database command related to system tables. In general, the use of a database command that relates to system tables indicates more advanced technical maturity.

As shown in row 200L of the table, another example of predefined attribute type is whether a database command relates to a schema change. In general, the use of a database command that relates to a schema change indicates more advanced technical maturity.

As shown in row 200M of the table, another example of predefined attribute type is whether a database command relates to the creation of an index table or lookup table. In general, the use of a database command that relates to the creation of an index table or lookup table indicates more advanced technical maturity.

Figure 3:
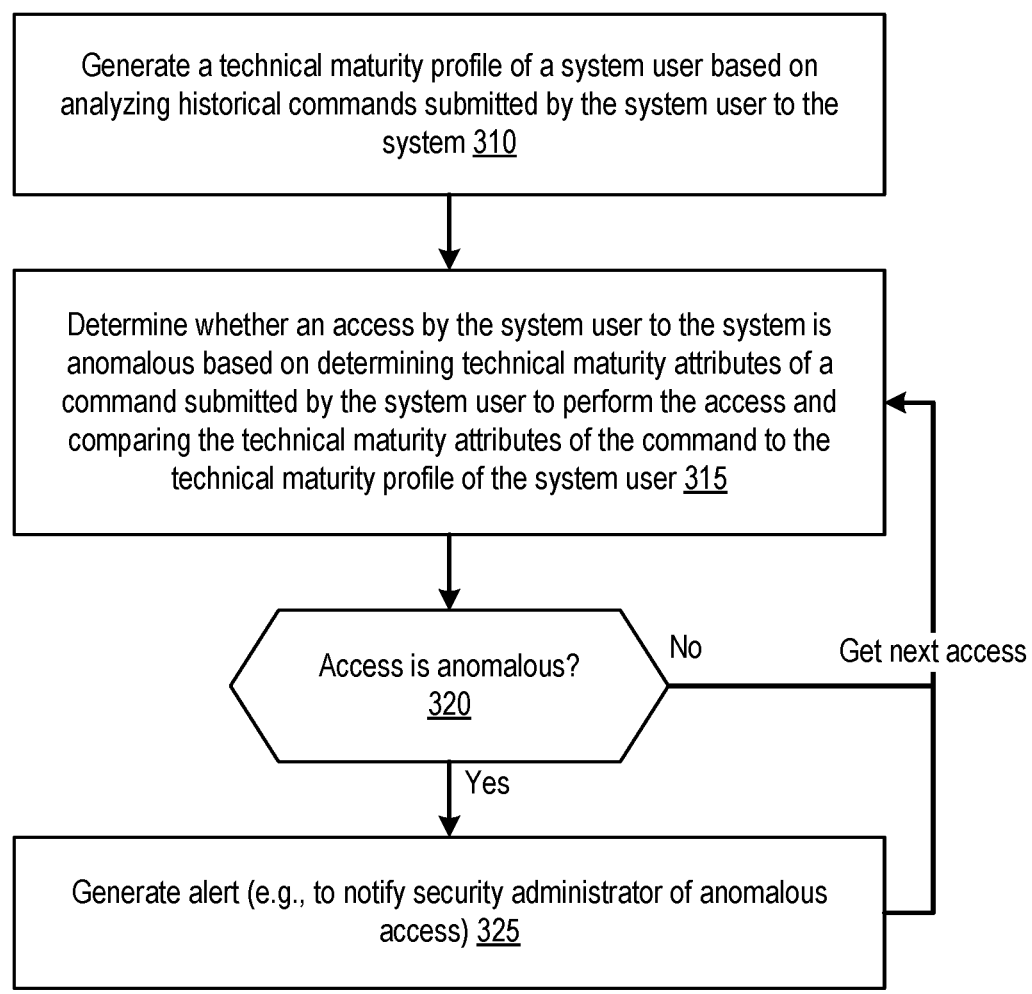
FIG. 3 shows a flow diagram of a method for detecting anomalous accesses to a system based on changes in technical maturity of system users, according to some embodiments.

FIG. 3 shows a flow diagram of a method for detecting anomalous accesses to a system based on changes in technical maturity of system users, according to some embodiments. The method may be implemented by one or more computing devices. The method may be implemented using hardware, software, firmware, or any combination thereof.

While the flow diagram shows a particular order of operations performed by certain embodiments, it should be understood that such order is provided as an example, and that other embodiments may perform the operations in a different order, combine certain operations, and/or overlap certain operations.

At block 310, the one or more computing devices generate a technical maturity profile of a system user based on analyzing historical commands submitted by the system user to the system. In one embodiment, the technical maturity profile of the system user is generated based on technical maturity attributes of the historical commands that correspond to predefined attribute types that have been designated as being indicative of technical maturity. The system user may be associated with a system user account (where it is possible that multiple end users (human users) use the same system user account to access the system). In one embodiment, the system is a database and the system user is a database user. In such an embodiment, the predefined attribute types may include one or more of: a number of clauses used in a database command, a number of sub-commands submitted as a batch in a database command, whether variables are used in a database command, whether syntactically unnecessary parentheses are used in a database command, whether aliasing is used in a database command, whether a more verbose construct is used in a database command when there is a less verbose construct that is functionally equivalent, whether an outer join is used in a database command, whether a keyword that that is unique to a particular database platform is used in a database command, a number of errors generated as a result of submitting a database command, whether syntax errors or misspellings occur in a database command, whether a database command relates to a system table, whether a database command relates to a schema change, and whether a database command relates to a creation of an index table or lookup table. In one embodiment, the predefined attribute types include attribute types that relate to properties of commands that do not affect function but relate to a form in which commands are written.

At block 315, the one or more computing devices determine whether an access by the system user to the system is anomalous based on determining technical maturity attributes of a command submitted by the system user to perform the access and comparing the technical maturity attributes of the command to the technical maturity profile of the system user. In one embodiment, the technical maturity profile of the system user includes information regarding the technical maturity attributes of the historical database commands. In such an embodiment, the comparing may include comparing the technical maturity attributes of the command to the information included in the technical maturity profile of the system user regarding the technical maturity attributes of the historical database commands. In one embodiment, the technical maturity profile of the system user includes a first value that represents the technical maturity of the system user, wherein the first value is determined based on the technical maturity attributes of the historical commands. In such an embodiment, the one or more computing devices may determine a second value that represents a technical maturity required to form the command based on the technical maturity attributes of the command, wherein the comparing may include comparing the first value to the second value.

In one embodiment, the technical maturity profile of the system user is included as part of a system access profile of the system user that further includes one or more of: an indication of one or more machines used by the system user, an indication of one or more clients used by the system user; and an indication of a time of day when the system user accesses the system.

At decision block 320, if the access is determined not to be anomalous, then the method proceeds back to block 315 to evaluate the next database access. Otherwise, if the access is determined to be anomalous, then at block 325, the one or more computing devices generate an alert (e.g., to notify a security administrator of an anomalous access).

In one embodiment, the one or more computing devices periodically update the technical maturity profile of the system user based on analyzing additional historical commands submitted by the system user to the system (e.g., the update may occur at predefined time intervals, after a certain number of commands have been submitted by the system user since the last update, and/or whenever a security administrator makes a request to update the technical maturity profile).

Figure 4:
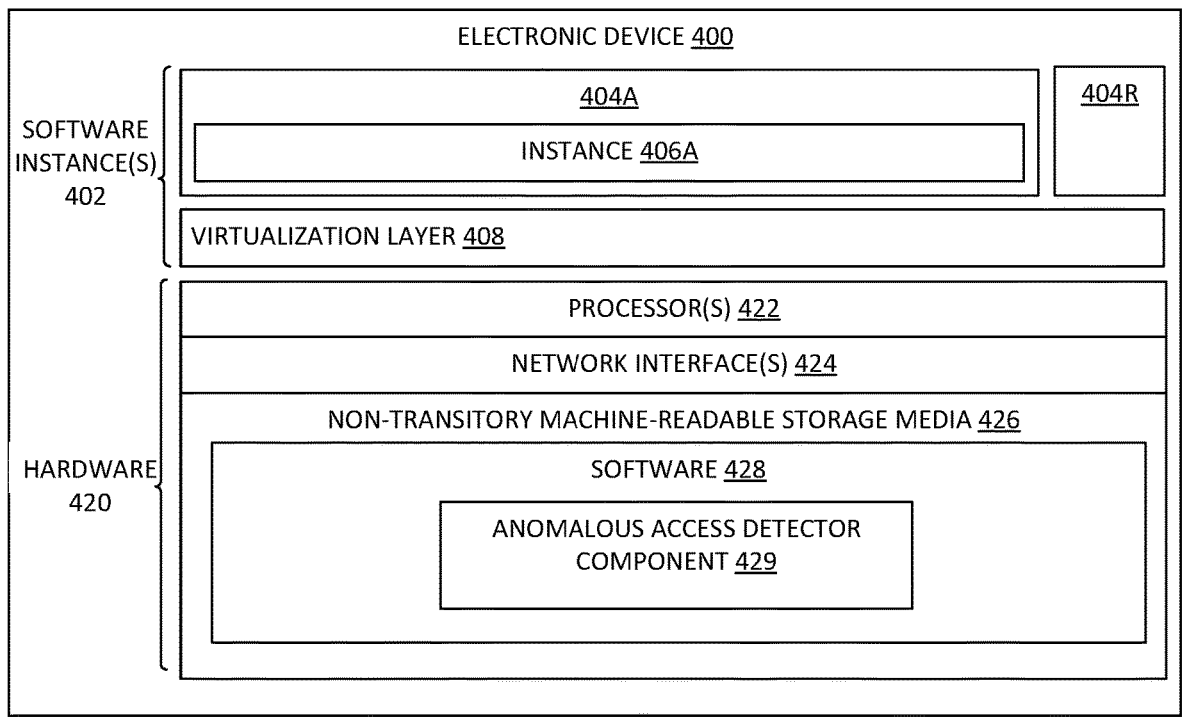
FIG. 4 shows a block diagram of an electronic/computing device, according to some embodiments.

FIG. 4 shows a block diagram of an electronic/computing device, according to some embodiments. FIG. 4 illustrates hardware 420 comprising a set of one or more processor(s) 422, a set of one or more network interfaces 424 (wireless and/or wired), and non-transitory machine-readable storage medium/media 426 having stored therein software 428 (which includes instructions executable by the set of one or more processor(s) 422). Software 428 can include code such as anomalous access detector component 429, which when executed by hardware 420, causes the electronic device 400 to perform operations of one or more embodiments described herein (e.g., operations for detecting anomalous accesses to a system based on changes in technical maturity of system users).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more computing devices to detect anomalous accesses to a system, the method comprising:
   generating a technical maturity profile of a system user based on analyzing historical commands submitted by the system user to the system; and
   determining whether an access by the system user to the system is anomalous based on determining technical maturity attributes of a command submitted by the system user to perform the access, comparing the technical maturity attributes of the command to the technical maturity profile of the system user, and determining whether the access involves copying of commands, wherein a determination that the access involves copying of commands reduces a likelihood that the access is determined to be anomalous to reduce false positives.

2. The method of claim 1, further comprising:
   generating an alert in response to a determination that the access is anomalous.

3. The method of claim 1, wherein the technical maturity profile of the system user is generated based on technical maturity attributes of the historical commands that correspond to predefined attribute types that have been designated as being indicative of technical maturity.

4. The method of claim 3, wherein the system is a database and the system user is a database user, wherein the predefined attribute types include one or more of:
   a number of clauses used in a database command;
   a number of sub-commands submitted as a batch in a database command;
   whether variables are used in a database command;
   whether syntactically unnecessary parentheses are used in a database command;
   whether aliasing is used in a database command; and
   whether a more verbose construct is used in a database command when there is a less verbose construct that is functionally equivalent.

5. The method of claim 4, wherein the predefined attribute types further include one or more of:
   whether an outer join is used in a database command;
   whether a keyword that is unique to a particular database platform is used in a database command;
   a number of errors generated as a result of submitting a database command;
   whether syntax errors or misspellings occur in a database command;
   whether a database command relates to a system table;
   whether a database command relates to a schema change; and
   whether a database command relates to a creation of an index table or lookup table.

6. The method of claim 3, wherein the predefined attribute types include attribute types that relate to properties of commands that do not affect function but relate to a form in which commands are written.

7. The method of claim 3, wherein the technical maturity profile of the system user includes information regarding the technical maturity attributes of the historical commands.

8. The method of claim 7, wherein the comparing includes comparing the technical maturity attributes of the command to the information included in the technical maturity profile of the system user.

9. The method of claim 3, wherein the technical maturity profile of the system user includes a first value that represents the technical maturity of the system user, wherein the first value is determined based on the technical maturity attributes of the historical commands.

10. The method of claim 9, further comprising: determining a second value that represents a technical maturity required to form the command based on the technical maturity attributes of the command, wherein the comparing includes comparing the first value to the second value.

11. The method of claim 1, wherein the technical maturity profile of the system user is included as part of a system access profile of the system user that further includes one or more of:
    an indication of one or more machines used by the system user;
    an indication of one or more clients used by the system user; and
    an indication of a time of day when the system user accesses the system.

12. The method of claim 1, further comprising:
    periodically updating the technical maturity profile of the system user based on analyzing additional historical commands submitted by the system user to the system.

13. A non-transitory machine-readable storage medium that provides instructions that, if executed by a processor of one or more computing devices, will cause said one or more computing devices to perform operations for detecting anomalous accesses to a system, the operations comprising:
    generating a technical maturity profile of a system user based on analyzing historical commands submitted by the system user to the system; and determining whether an access by the system user to the system is anomalous based on determining technical maturity attributes of a command submitted by the system user to perform the access, comparing the technical maturity attributes of the command to the technical maturity profile of the system user, and determining whether the access involves copying of commands, wherein a determination that the access involves copying of commands reduces a likelihood that the access is determined to be anomalous to reduce false positives.

14. The non-transitory machine-readable storage medium of claim 13, wherein the operations further comprise:
generating an alert in response to a determination that the access is anomalous.

15. The non-transitory machine-readable storage medium of claim 13, wherein the technical maturity profile of the system user is generated based on technical maturity attributes of the historical commands that correspond to predefined attribute types that have been designated as being indicative of technical maturity.

16. The non-transitory machine-readable storage medium of claim 15, wherein the system is a database and the system user is a database user, wherein the predefined attribute types include one or more of:
a number of clauses used in a database command;
a number of sub-commands submitted as a batch in a database command;
whether variables are used in a database command;
whether syntactically unnecessary parentheses are used in a database command;
whether aliasing is used in a database command; and
whether a more verbose construct is used in a database command when there is a less verbose construct that is functionally equivalent.

17. A computing device configured to detect anomalous accesses to a system, the computing device comprising:
one or more processors; and
a non-transitory machine-readable storage medium having instructions stored therein, which when executed by the one or more processors, causes the computing device to:
generate a technical maturity profile of a system user based on analyzing historical commands submitted by the system user to the system and
determine whether an access by the system user to the system is anomalous based on determining technical maturity attributes of a command submitted by the system user to perform the access, comparing the technical maturity attributes of the command to the technical maturity profile of the system user, and determining whether the access involves copying of commands, wherein a determination that the access involves copying of commands reduces a likelihood that the access is determined to be anomalous to reduce false positives.

18. The computing device of claim 17, wherein the instructions, when executed by the one or more processors, further causes the computing device to:
generate an alert in response to a determination that the access is anomalous.

19. The computing device of claim 17, wherein the technical maturity profile of the system user is generated based on technical maturity attributes of the historical commands that correspond to predefined attribute types that have been designated as being indicative of technical maturity.

20. The computing device of claim 19, wherein the system is a database and the system user is a database user, wherein the predefined attribute types include one or more of:
a number of clauses used in a database command;
a number of sub-commands submitted as a batch in a database command;
whether variables are used in a database command;
whether syntactically unnecessary parentheses are used in a database command;
whether aliasing is used in a database command; and
whether a more verbose construct is used in a database command when there is a less verbose construct that is functionally equivalent.

* * * * *